United States Patent
Yamakawa et al.

(10) Patent No.: US 6,454,207 B1
(45) Date of Patent: Sep. 24, 2002

(54) FLAP SUPPORT MECHANISM AND A FLAP-EQUIPPED ROTOR BLADE

(75) Inventors: Eiichi Yamakawa; Noriaki Katayama; Tetsuya Hori, all of Kakamigahara (JP)

(73) Assignee: Advanced Technology Institute of Commuter-Helicopter, Ltd., Gifu (JP)

(*) Notice: Subject to any disclaimer, the term of this patent is extended or adjusted under 35 U.S.C. 154(b) by 1 day.

(21) Appl. No.: 09/702,809

(22) Filed: Nov. 1, 2000

(30) Foreign Application Priority Data

Nov. 1, 1999 (JP) .......................................... 11-311475

(51) Int. Cl.$^7$ ................................................ B64C 9/02
(52) U.S. Cl. ...................................... 244/75 R; 416/23
(58) Field of Search ................................ 246/213, 214, 246/215, 75 R, 38; 416/23, 88, 135, 49, 145

(56) References Cited

U.S. PATENT DOCUMENTS

| | | | | |
|---|---|---|---|---|
| 1,729,210 A | * | 9/1929 | Delage | 244/75 A |
| 2,113,000 A | * | 4/1938 | Rowe | 244/75 A |
| 2,232,289 A | * | 2/1941 | Upson | 416/23 |
| 2,584,667 A | * | 2/1952 | Bockrath | 244/75 A |
| 2,892,502 A | * | 6/1959 | Donovan | 244/75 A |
| 3,883,093 A | * | 5/1975 | Violleau | 244/82 |
| 4,483,498 A | * | 11/1984 | Boehringer | 244/75 A |
| 4,514,143 A | * | 4/1985 | Campbell | 416/23 |
| 5,096,378 A | * | 3/1992 | Jamieson | 416/23 |

FOREIGN PATENT DOCUMENTS

| | | |
|---|---|---|
| JP | 9-254894 | 9/1997 |
| JP | 11-227696 | 8/1999 |

\* cited by examiner

*Primary Examiner*—Galen L. Barefoot
(74) *Attorney, Agent, or Firm*—Wenderoth, Lind & Ponack, L.L.P.

(57) ABSTRACT

A flap support mechanism for attachment of a flap to a rotor blade so as to permit angular displacement with respect thereto has a tension-torsion member disposed coaxial with a hinge axis of the flap. One end at the blade root side of the tension-torsion member is secured to the rotor blade. The other end at the blade tip side of the tension-torsion member is secured to the flap. The tension-torsion member is placed such that it passes through a narrow cavity formed at the interior of the rotor blade. Such construction permits smooth flap motion in spite of a large centrifugal force.

20 Claims, 4 Drawing Sheets

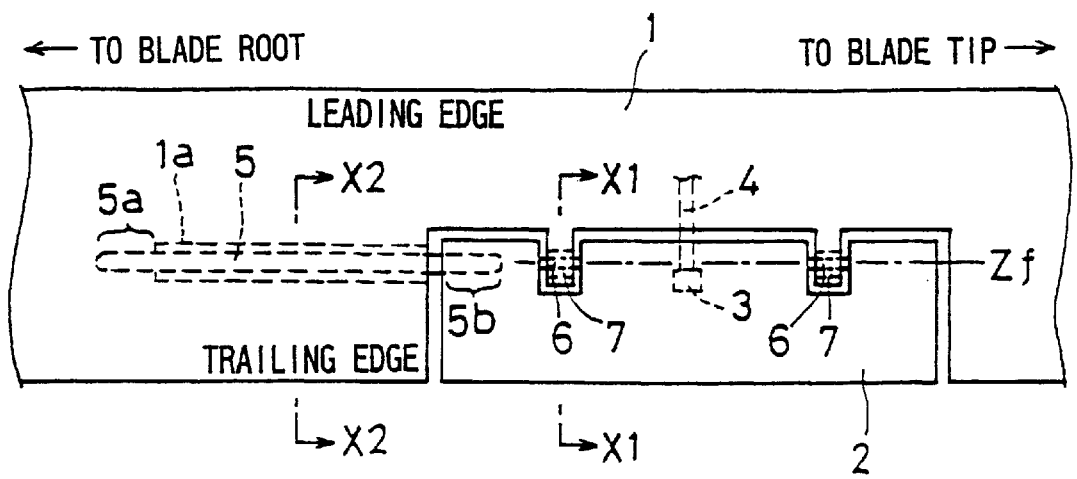
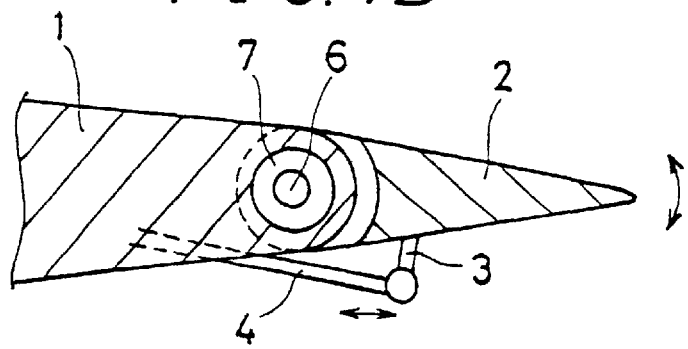
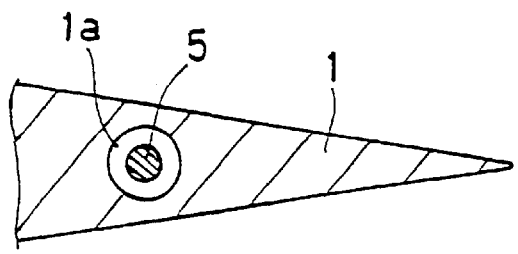

FLAP SUPPORT MECHANISM AND A FLAP-EQUIPPED ROTOR BLADE

BACKGROUND OF THE INVENTION

1. Field of the Invention

The present invention relates to a flap support mechanism for attachment of a flap to a helicopter rotor blade and to a flap-equipped rotor blade provided with the same.

2. Description of the Related Art

Rotation of a helicopter rotor blade causes action of centrifugal force proportional to a distance from the rotor center and to the square of a rotational velocity of the rotor. The centrifugal force at the tip of the blade can reach approximately 800 G to 1,000 G. When the rotor blade is provided with a flap, centrifugal force dependent on the mass thereof will act on the center of mass of the flap. It is therefore demanded of a flap hinge mechanism to ensure an angular displacement motion of the flap despite the large centrifugal force and the centrifugal moment corresponding to the distance from the hinge axis to the center of mass of the flap.

When a thrust bearing is used in the flap hinge mechanism, for example, so as to be able to withstand centrifugal force along the direction of the hinge axis, the large centrifugal force causes an increased frictional loss at the bearing and there is a dramatic reduction in flap output angle.

SUMMARY OF THE INVENTION

It is an object of the present invention to provide a flap support mechanism and a flap-equipped rotor blade that permits smooth flap motion in spite of a large centrifugal force.

The invention provides a flap support mechanism for angularly displaceable support of a flap attached to a helicopter rotor blade. The flap support mechanism comprises: a tension-torsion member disposed coaxial with an axis of angular displacement of a flap, wherein one end at a blade root side of the tension-torsion member is secured to the rotor blade, and the other end at a blade tip side thereof is secured to the flap.

In accordance with the invention, when centrifugal force acts on the flap during rotation of the rotor blade, a tension-torsion member coupling the rotor blade and the flap permits support of flap centrifugal force by means of tensile support of the tension-torsion member. Accordingly, the need for the flap hinge mechanism to employ a thrust bearing, for example, such as would be able to withstand centrifugal force can be eliminated, permitting elimination of frictional losses at the hinge. Moreover, because the tension-torsion member can also function as a torsion spring, disposing the tension-torsion member coaxial with the axis of angular displacement of the flap permits smooth angular displacement motion of the flap.

The tension-torsion member is sometimes called "tension torsion straps," "torsion bars," and the like, and may be a rod-like, bar-like, fiber-like, wire-like, or laminate-like member formed of high-tensile-strength metal, fiber-reinforced plastic or the like. Because such a tension-torsion member produces almost no frictional loss, it is instrumental in improving flap drive system efficiency.

Furthermore, in the invention, it is preferable that the mechanism comprises a bearing possessing a rotational axis coaxial with an axis of angular displacement of the flap, for coupling the rotor blade and the flap.

In accordance with the invention, because centrifugal force is reduced and tensile supporting force of the tension-torsion member decreases when the rotor blade is stationary or is turning at low rotational velocity, provision of the bearing for coupling the rotor blade and the flap can prevent radial deviation from flap axis and sagging of the flap due to its own weight. Furthermore, because centrifugal force produced during rotation of the rotor blade is supported by the tension-torsion member, there is no increase in the axial (thrust) load on the bearing, permitting reductions in the size and weight of the bearing and elimination of nearly all of the frictional losses associated with the thrust bearing. Furthermore, in the invention, it is preferable that the tension-torsion member passes through a cavity formed at an interior of the flap and is secured to the flap at a location toward the blade tip.

In accordance with the invention, because torsional stroke increases with an increase of length of the tension-torsion member, a cavity is formed at the interior of the flap, and by arranging the tension-torsion member to pass through the cavity, it is possible to maximize the effective length of the tension-torsion member, permitting savings in space and reductions in size of the flap support mechanism.

Furthermore, the invention provides a flap support mechanism for angularly displaceable support of a flap attached to a helicopter rotor blade the flap support mechanism comprises first and second tension-torsion members being disposed coaxial with an axis of angular displacement of a flap, wherein one end at a blade root side of the first tension-torsion member is secured to the rotor blade, and the other end at a blade tip side thereof is secured to the flap, and one end at the blade root side of the second tension-torsion member is secured to the flap, and the other end at the blade tip side thereof is secured to a tension-applying mechanism.

In accordance with the invention, when centrifugal force acts on the flap during rotation of the rotor blade, the first tension-torsion member coupling the rotor blade and the flap permits support of flap centrifugal force by means of tensile support of the first tension-torsion member. Moreover, because the first tension-torsion member and the second tension-torsion member can also function as torsion springs, disposing the first and second tension-torsion members coaxial with the axis of angular displacement of the flap permits smooth angular displacement motion of the flap.

Furthermore, since the tension-applying mechanism is provided at the other end at the blade tip side of the second tension-torsion member, tensile forces of the first and second tension-torsion members can establish a stable flap axis of angular displacement. Accordingly, radial deviation from flap axis during operation of the flap is prevented.

The tension-torsion members are sometimes called "tension torsion straps," "torsion bars," and the like, and may be rod-like, bar-like, fiber-like, wire-like, or laminate-like members formed of high-tensile-strength metal or fiber-reinforced plastic or the like. Because such a tension-torsion member produces almost no frictional loss, it is instrumental in improving flap drive system efficiency.

Furthermore, as the tension-applying mechanism may be employed a slide weight mechanism capable of movement in the blade spanwise direction, being the direction in which centrifugal force acts, or a preload mechanism whereby the tension-torsion member is previously loaded with tension at the time of installation of the tension-torsion member, or the like.

Furthermore, in the invention, it is preferable that the first tension-torsion member and the second tension-torsion member are mutually coupled.

In accordance with the invention, when the two ends of the flap are supported in tensile fashion by first and second tension-torsion members, mutual coupling of the first tension-torsion member to the second tension-torsion member can reduce tensile stress inside the flap, since the tensile load of the first and second tension-torsion members can no longer act directly on the flap.

Furthermore, in the invention, it is preferable that the mechanism comprises a stabilizer bearing for preventing radial deviation of the first tension-torsion member and second tension-torsion member.

In accordance with the invention, because centrifugal force is reduced and the tensile supporting force of a tension-torsion member decreases when the rotor blade is stationary or is turning at low rotational velocity, provision of the stabilizer bearing for preventing radial deviation of the first tension-torsion member and second tension-torsion member can prevent of radial deviation of flap axis and sagging of the flap due to its own weight. Furthermore, because centrifugal force produced during rotation of the rotor blade is supported by the tension-torsion members, there is no increase in the axial (thrust) load on the bearing, permitting reductions in the size and weight of the bearing.

Furthermore, in the invention, it is preferable that the mechanism comprises a tuning weight provided at the leading edge of the flap, for aligning a center of mass of the flap with the axis of angular displacement of the flap.

In accordance with the invention, the tuning weight is provided at the leading edge of the flap to align the center of mass of the flap with the axis of angular displacement of the flap. As a result, the moment about the flap axis of angular displacement arising due to inertial forces corresponding to the distance between the center of mass and the flap axis of angular displacement can be cancelled. Accordingly, the load on the flap drive system is reduced. In addition, application of the invention permits prevention of flap flutter.

Furthermore, the invention provides a flap-equipped rotor blade comprising the flap support mechanism as described above.

In accordance with the invention, a rotor blade capable of smooth flap motion in spite of large centrifugal force can be obtained because flap centrifugal force can be supported by means of tensile support of a tension-torsion member.

BRIEF DESCRIPTION OF THE DRAWINGS

Other and further objects, features, and advantages of the invention will be more explicitly explained from the following detailed description taken with reference to the drawings wherein:

FIGS. 1A through 1C are drawings showing the construction of a first embodiment of the invention, FIG. 1A being a partial plan view as seen from above a blade, FIG. 1B being a partial cross-sectional view of section X1—X1 in FIG. 1A, and FIG. 1C being a partial cross-sectional view of section X2—X2 in FIG. 1A;

DETAILED DESCRIPTION OF THE PREFERRED EMBODIMENTS

Figure 2:
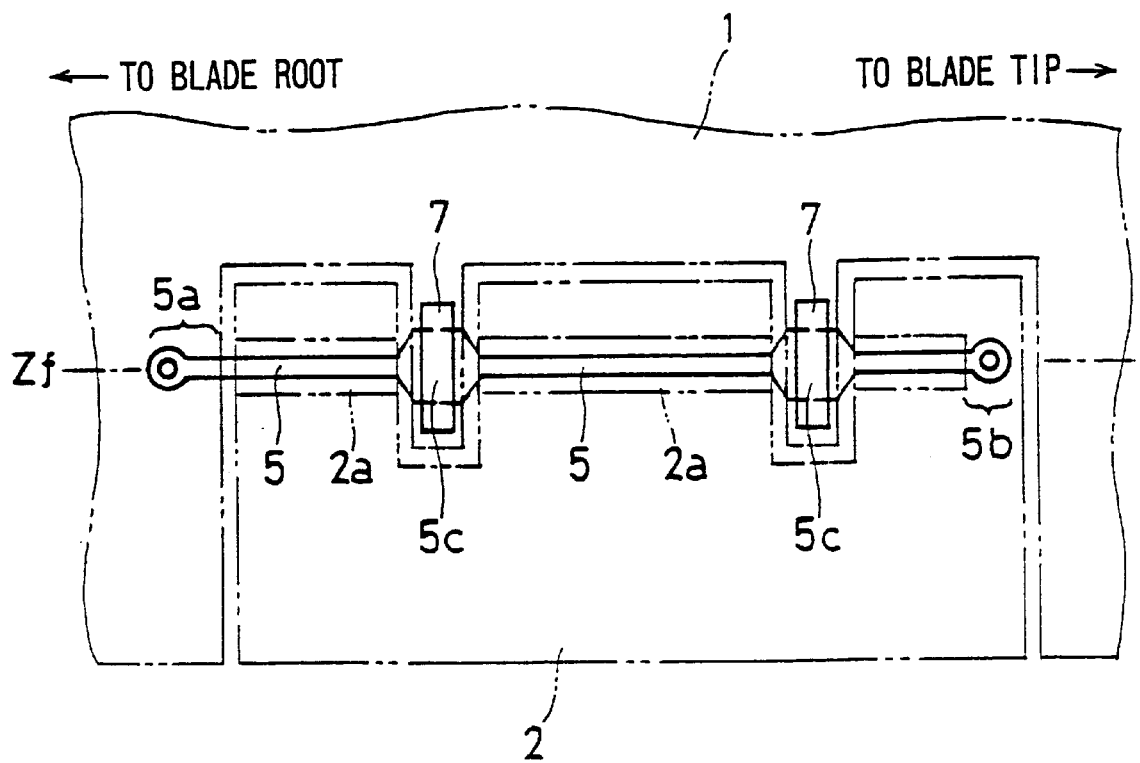
FIG. 2 is a partial plan view showing a second embodiment of the invention.

Now referring to the drawings, preferred embodiments of the invention are described below.

FIGS. 1A through 1C are drawings showing the construction of the first embodiment of the invention, FIG. 1A being a partial plan view as seen from above a blade, FIG. 1B being a partial cross-sectional view of section X1—X1 in FIG. 1A, and FIG. 1C being a partial cross-sectional view of section X2—X2 in FIG. 1A. A flap 2 is typically provided at a location toward a blade tip where airspeed is greatest and at a trailing edge of the blade so as to construct a portion of the blade airfoil.

The flap support mechanism, being for attaching the flap 2 to a helicopter rotor blade 1, so as to permit angular displacement with respect thereto, comprises a tension-torsion member 5 disposed coaxially with a hinge axis Zf of the flap 2. The tension-torsion member 5, being a rod-like, bar-like, fiber-like, wire-like, or laminate-like member formed of metal or fiber-reinforced plastic or the like, is high in tensile strength and possesses a certain amount of torsional elasticity.

One end 5a at the blade root side of the tension-torsion member 5 is secured to the rotor blade 1. Another end 5b at the blade tip side of the tension-torsion member 5 is secured to the flap 2. The tension-torsion member 5 is placed such that it passes through a narrow cavity 1a formed at the interior of the rotor blade 1. Such construction allows for the torsional motion of the tension-torsion member 5, the central region exclusive of the ends 5a, 5b representing the effective length of a torsion spring constructed thereby.

The rotor blade 1 and the flap 2 are coupled by a plurality (e.g., two) of bearings 7. The bearings 7 are, for example, a radial type which, when mounted on a hinge rod 6 of the flap 2, define the hinge axis Zf of the flap 2 and prevent radial deviation of flap axis and sagging of the flap 2 due to its own weight.

An actuator (not shown) for driving the flap is provided at the interior of the blade 1 and a drive rod 4 and a drive arm 3 of the flap 2 are joined by means of a pin, which construct a drive link mechanism. Displacement of the drive rod 4 in the axial direction, as a result of driving of the actuator, causes the flap 2 to be angularly displaced upward or downward about the hinge axis Zf. Such flap control permits improvement in the aerodynamic characteristics of the rotor blade, making reductions in vibration and in audible noise, for example, possible.

Employment of such a tension-torsion member 5 to provide tensile support of the flap 2 from the root end of the blade permits smooth flap motion while permitting positive support of centrifugal force acting on the flap 2 during rotation of the rotor blade. Furthermore, because the centrifugal force from the flap 2 does not act on a bearing 7, which prevents radial deviation, reductions in the size and weight of the bearing 7 can be achieved, and because the bearing need not support the centrifugal force, a frictional loss at the bearing can be almost completely eliminated.

FIG. 2 is a partial plan view showing the second embodiment of the invention. The tension-torsion member 5 is disposed coaxial with the hinge axis Zf of the flap 2, the end 5a at the blade root side of the tension-torsion member 5 is secured to the rotor blade 1, and the end 5b at the blade tip side of the tension-torsion member 5 is secured to the flap 2 at a location toward the blade tip. The tension-torsion member 5 is placed such that it passes through a narrow cavity 2a formed at the interior of the flap 2.

The rotor blade 1 and the flap 2 are coupled by a plurality (e.g., two) of bearings 7, each of the bearings 7 being attached to a fat portion 5c of the tension-torsion member 5 so as to define the hinge axis Zf of the flap 2 and prevent radial deviation of the flap axis and sagging of the flap 2 due to its own weight. The fat portions 5c are formed for the purpose of fitting the tension-torsion member 5 to the inner diameter of the bearing 7 when the diameter of the tension-torsion member 5 is small, e.g., on the order of several millimeters.

The greater the allowable angle of torsional movement, the greater the effective length of the torsion spring constructed by the tension-torsion member 5. In FIGS. 1A through 1C, since the cavity 1a through which the tension-torsion member 5 passes is formed at the interior of the rotor blade 1, the overall length of the support mechanism is large.

In FIG. 2, in contrast, because the cavity 2a is formed at the interior of the flap 2 and the tension-torsion member 5 passes through this cavity 2a, the overall length of the support mechanism is reduced and reduction in the space occupied thereby is achieved.

Figure 3:
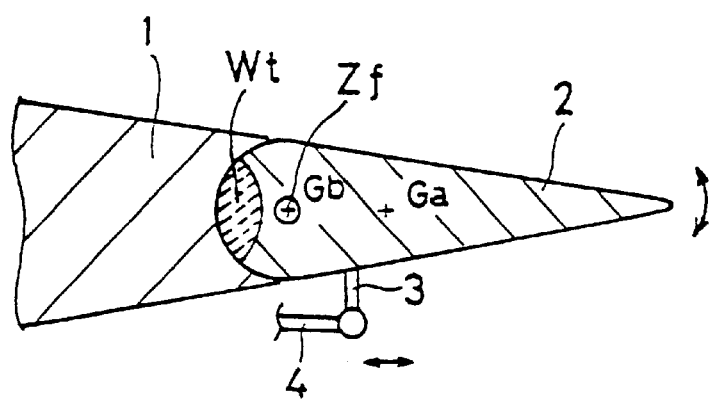
FIG. 3 is a partial cross-sectional view showing a third embodiment of the invention.

FIG. 3 is a partial cross-sectional view showing the third embodiment of the invention. The flap 2 is supported so as to allow angular displacement with respect to the rotor blade 1 about the hinge axis Zf. Embedded in the leading edge side of the flap 2 is a tuning weight Wt.

When the tuning weight Wt is absent, a moment would be created about the flap axis of angular displacement due to inertial forces corresponding to the weight of the flap 2 and the distance to the hinge axis Zf because the center of mass Ga of the flap 2 would be located rearward of the hinge axis Zf. As a result, the flap drive system would be required to provide a drive force for supporting not only the inertial moment about the hinge axis Zf of the flap 2, but also a moment arising due to inertial forces from the center of mass thereof.

In contrast hereto, as shown in FIG. 3, when the tuning weight Wt is provided, and the center of mass Gb of the flap 2 is aligned with the hinge axis Zf, while there is some increase in inertial moment as a result of addition of the tuning weight Wt, the load of the flap drive system can be reduced because it is possible to cancel the moment about the flap axis of angular displacement which arises due to the weight of the flap 2. Furthermore, as is commonly known, flap flutter can also be prevented.

Such a tuning weight Wt is advantageous not only in the structures as shown in FIGS. 1A through 1C and in FIG. 2, but also in the structures to be described below.

Figure 4:
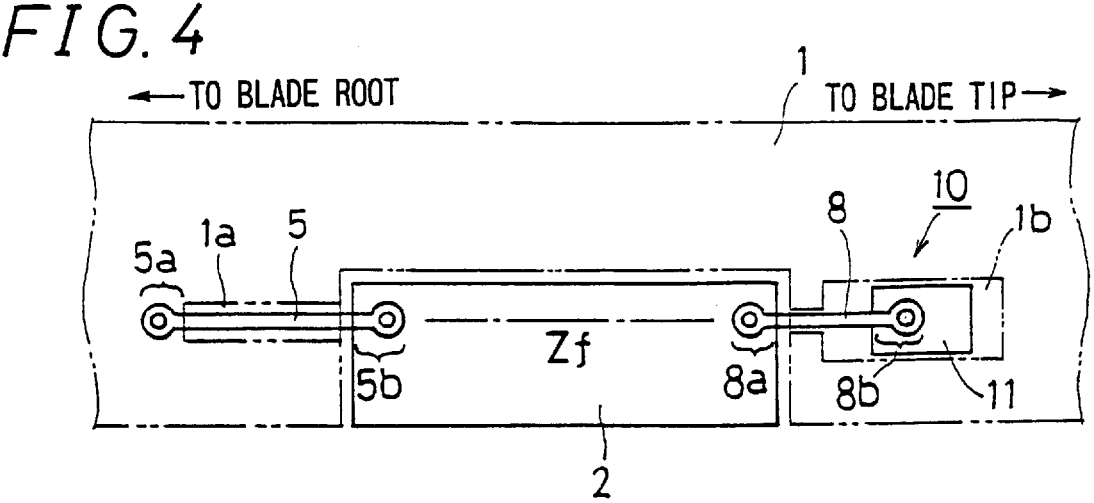
FIG. 4 is a partial plan view showing a fourth embodiment of the invention.

FIG. 4 is a partial plan view showing the fourth embodiment of the invention. A flap support mechanism, comprising two tension-torsion members 5 and 8 disposed coaxial with the hinge axis Zf of the flap 2, supports the flap 2 so as to permit angular displacement with respect to the rotor blade 1. Tension-torsion members 5 and 8, being rod-like, bar-like, fiber-like, wire-like, or laminate-like members formed of metal or fiber-reinforced plastic or the like, are high in tensile strength and possess a certain amount of torsional elasticity.

The end 5a at the blade root side of the tension-torsion member 5 is secured to the rotor blade 1, the end 5b at the blade tip side of the tension-torsion member 5 is secured to the flap 2, and the tension-torsion member 5 is placed such that it passes through the narrow cavity 1a formed at the interior of the rotor blade 1.

One end 8a at the blade root side of the tension-torsion member 8 is secured to the flap 2, the other end 8b at the blade tip side of the tension-torsion member 8 is secured to a tension-applying mechanism 10, and the tension-torsion member 8 is placed such that it passes through a cavity 1b formed at the interior of the rotor blade 1.

Such cavity support allows for the torsional motion of tension-torsion members 5 and 8, the respective central regions exclusive of the ends 5a, 5b, 8a, 8b representing the effective lengths of the torsion springs constructed thereby.

The tension-applying mechanism 10 comprises a slide weight 11 capable of movement in the blade spanwise direction. The rotation of the rotor blade 1 causes action of a large centrifugal force at the slide weight 11 as well, and a tensile force due to the centrifugal force of the slide weight 11 is applied to the tension-torsion member 8. At this time, because, in addition to a tensile force due to the centrifugal force of the flap 2, there is also a tensile force due to the centrifugal force of the slide weight 11 superimposed on the tension-torsion member 5, the hinge axis Zf of the flap 2 is stably established by means of the tensile forces acting from the left and right ends, and radial deviation of flap axis is prevented even without use of the bearing 7, such as been shown in FIGS. 1A through 1C and in FIG. 2. Moreover, the location of the end plane at the tip side of the cavity 1b is set so as to obtain a desired value of tensile force from the centrifugal force of the slide weight 11.

Moreover, the bearing 7 may be provided in order to prevent radial deviation of the flap axis or sagging of the flap 2 due to its own weight because of disappearance of the centrifugal force of the slide weight 11 when the rotor blade 1 stops.

Employment of such a tension-applying mechanism 10 permits a reduction in weight and a simplification of the flap support mechanism, and facilitates tuning of the hingeline axis.

Figure 5:
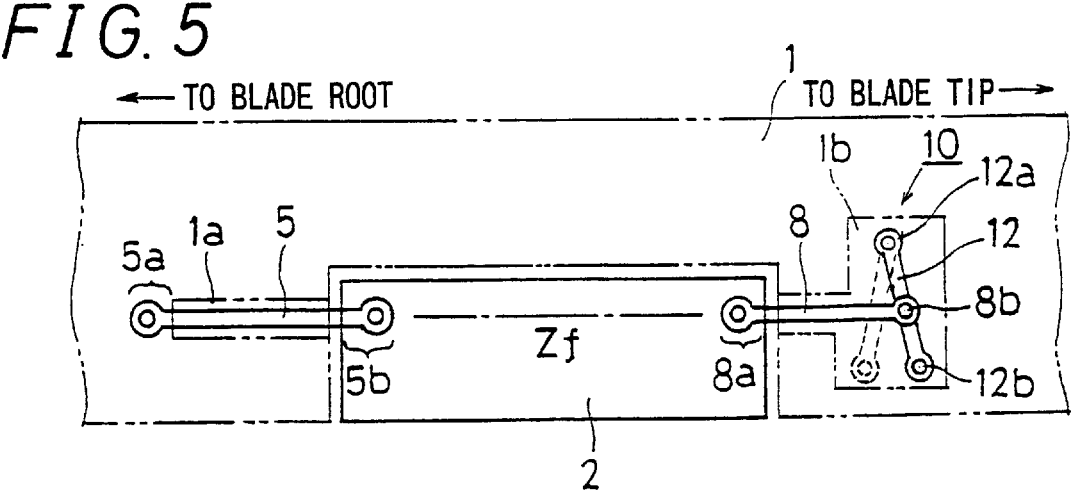
FIG. 5 is a partial plan view showing a fifth embodiment of the invention.

FIG. 5 is a partial plan view showing the fifth embodiment of the invention. The flap support mechanism therein, being similar in structure to that shown in FIG. 4, comprises two tension-torsion members 5 and 8 disposed coaxial with the hinge axis Zf of the flap 2, and supporting the flap 2 so as to permit angular displacement with respect to the rotor blade 1. The end 8a at the blade root side of the tension-torsion member 8 is secured to the flap 2, and the end 8b at the blade tip side of the tension-torsion member 8 is secured to the tension-applying mechanism 10.

This tension-applying mechanism 10 comprises a lever rod 12 capable of angular displacement about a pivot point 12a, and a fastener (e.g., screw) that secures a lever point 12b. The end 8b at the blade tip side of the tension-torsion member 8 is coupled to a central region of the lever rod 12. At the time of installation of the tension-torsion member 8, pulling on the tension-torsion member 8 such that it extends beyond a location corresponding to its untensioned length and securing lever point 12b with the tension-torsion member 8 under tension achieves a static preload mechanism.

As is the case with the structure shown in FIG. 4, employment of such a tension-applying mechanism 10 permits reduction in weight and simplification of the flap support mechanism, and facilitates tuning of the hingeline axis.

Figure 6:
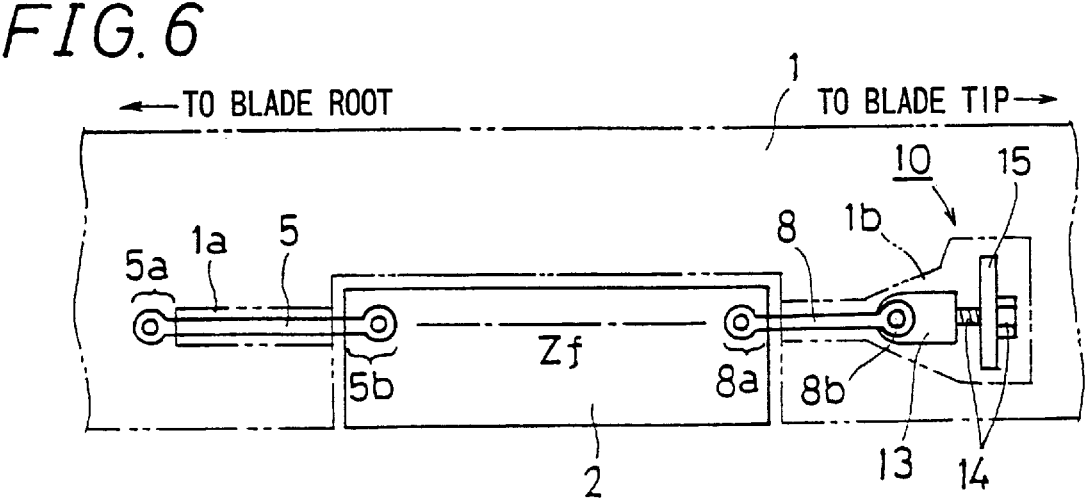
FIG. 6 is a partial plan view showing a sixth embodiment of the invention.

FIG. 6 is a partial plan view showing the sixth embodiment of the invention. The flap support mechanism therein, being similar in structure to that shown in FIG. 4, comprises two tension-torsion members 5 and 8 disposed coaxial with the hinge axis Zf of the flap 2, and supporting the flap 2 so as to permit angular displacement with respect to the rotor blade 1. The end 8a at the blade root side of the tension-torsion member 8 is secured to the flap 2, and the end 8b at the blade tip side of the tension-torsion member 8 is secured to the tension-applying mechanism 10.

This tension-applying mechanism 10 comprises a nut 13 which is coupled to the end 8b at the blade tip side of the tension-torsion member 8, a bolt 14 which screws into the nut 13, and a stationary plate 15 which supports the bolt 14. At the time of installation of the tension-torsion member 8, tightening of the bolt 14 causes the tension-torsion member 8 to be pulled such that it extends beyond a location corresponding to its untensioned length, placing it under tension and resulting in the achievement of a static preload mechanism.

Figure 7:
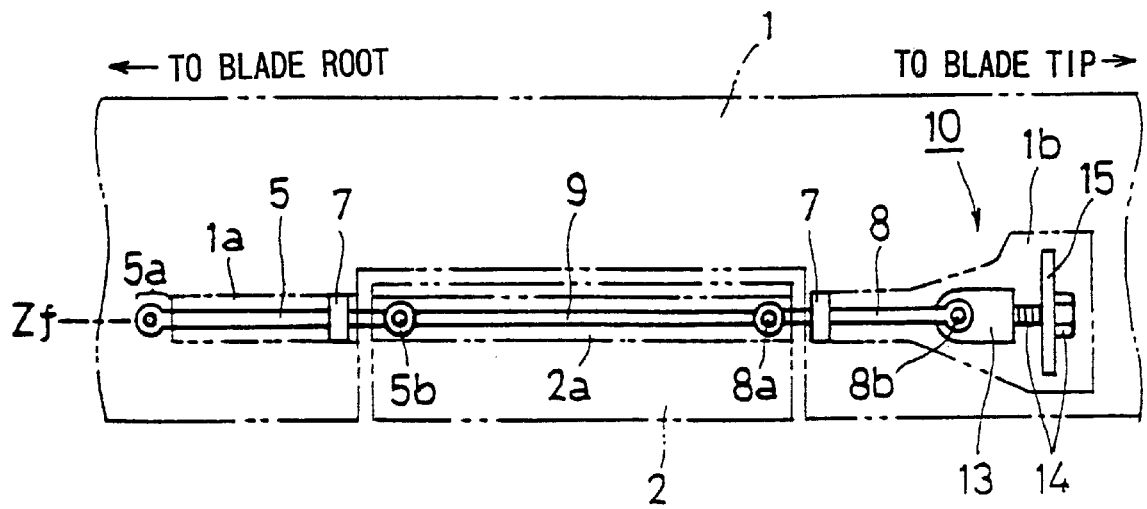
FIG. 7 is a partial plan view showing a seventh embodiment of the invention.

FIG. 7 is a partial plan view showing the seventh embodiment of the invention. The flap support mechanism therein, being similar in structure to that shown in FIG. 4, comprises two tension-torsion members 5 and 8 disposed coaxial with the hinge axis Zf of the flap 2, and supporting the flap 2 so as to permit angular displacement with respect to the rotor blade 1.

The end 5a at the blade root side of the tension-torsion member 5 is secured to the rotor blade 1, the end 5b at the blade tip side of the tension-torsion member 5 is secured to the flap 2, and the tension-torsion member 5 is placed such that it passes through the narrow cavity 1a formed at the interior of the rotor blade 1.

The end 8a at the blade root side of the tension-torsion member 8 is secured to the flap 2, the end 8b at the blade tip side of the tension-torsion member 8 is secured to the tension-applying mechanism 10, and the tension-torsion member 8 is placed such that it passes through the cavity 1b formed at the interior of the rotor blade 1. This tension-applying mechanism 10 consists of a preload mechanism comprising the nut 13 and the bolt 14,as is the case at FIG. 6.

The end 5b at the blade tip side of the tension-torsion member 5 and the end 8a at the blade root side of the tension-torsion member 8 are coupled by a coupling member 9, which is placed such that it passes through the narrow cavity 2a formed at the interior of the flap 2.

As a result of use of such a coupling member 9 to couple the tension-torsion members 5 and 8, tensile forces arising at tension-torsion members 5 and 8 are transmitted along the coupling member 9, permitting the reduction of the tensile stress at the interior of the flap 2.

A structure wherein the tension-torsion members 5 and 8 and coupling member 9 are formed in integral fashion as a single tension-torsion member which is secured to the flap 2 at locations corresponding to the ends 5b and 8a is also possible.

Furthermore, a structure wherein the rotor blade 1 supports tension-torsion members 5 and 8 by means of the bearings 7 which are respectively mounted therein, preventing radial deviation of the flap axis, is also possible.

Figure 8:
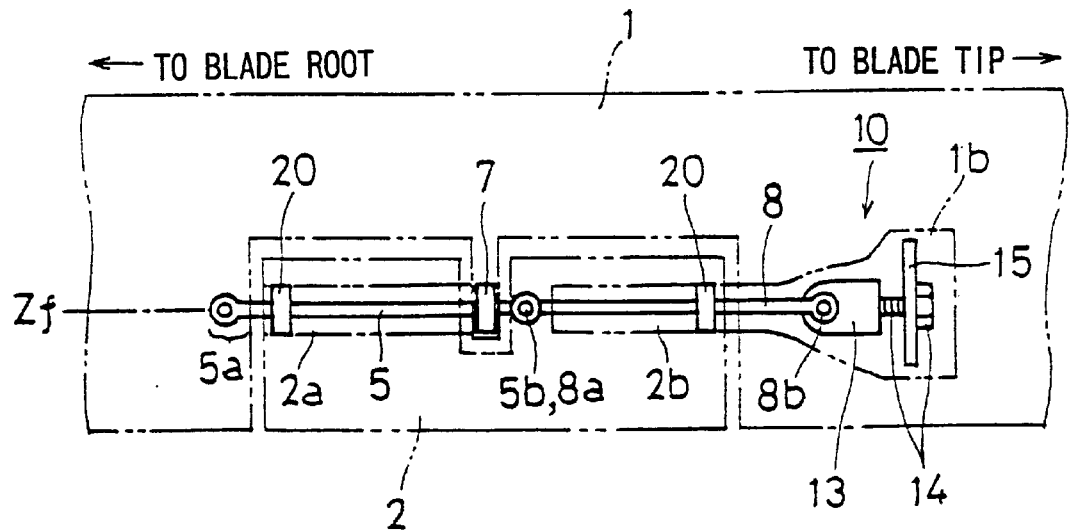
FIG. 8 is a partial plan view showing an eighth embodiment of the invention.

FIG. 8 is a partial plan view showing the eighth embodiment of the invention. The flap support mechanism therein, being similar in structure to that shown in FIG. 4, comprises two tension-torsion members 5 and 8 disposed coaxial with the hinge axis Zf of the flap 2, and supporting the flap 2 so as to permit angular displacement with respect to the rotor blade 1.

The end 5a at the blade root side of the tension-torsion member 5 is secured to the rotor blade 1, the end 5b at the blade tip side of the tension-torsion member 5 is secured in the vicinity of the center of the flap 2, and the tension-torsion member 5 is placed such that it passes through the narrow cavity 2a formed at the interior of the flap 2.

The end 8a of the tension-torsion member 8 at the blade root side is secured to the flap 2 together with the end 5b, the end 8b at the blade tip side of the tension-torsion member 8 is secured to the tension-applying mechanism 10, and the tension-torsion member 5 is placed such that it passes through a cavity 2b formed at the interior of the flap 2 and the cavity 1b formed at the interior of the rotor blade 1. This tension-applying mechanism 10 consists of a preload mechanism comprising the nut 13 and the bolt 14, as is the case at FIG. 6.

Herein, the same as in FIG. 2, because the cavities 2a and 2b are formed at the interior of the flap 2 and two tension-torsion members 5 and 8 pass through these cavities 2a and 2b, the overall length of the support mechanism is shortened and a reduction in the space occupied thereby is achieved.

Furthermore, with continued reference to FIG. 8, as a result of coupling of tension-torsion members 5 and 8, tensile forces arising at the tension-torsion members 5 and 8 are not transmitted to the flap 2, permitting the reduction of the tensile stress at the interior of the flap 2.

Moreover, a structure wherein the tension-torsion members 5 and 8 are formed in an integral fashion as a single tension-torsion member which is secured to the flap 2 at a location corresponding to the ends 5b and 8a is also possible.

Furthermore, a structure wherein the rotor blade 1 supports the tension-torsion member 5 by means of a bearing 7, and the flap 2 supports tension-torsion members 5 and 8 by means of bearings 20, which are respectively mounted therein, preventing radial deviation of flap axis, is also possible.

The invention may be embodied in other specific forms without departing from the spirit or essential characteristics thereof. The embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A flap support mechanism for angularly displaceable support of a flap attached to a rotor blade, said flap support mechanism comprising:
a tension-torsion member disposed coaxial with an axis of angular displacement of the flap, said tension-torsion member being partially contained within both the flap and the rotor blade,
wherein a first end of said tension-torsion member towards a blade root side of the rotor blade is secured to the rotor blade and a second end of said tension-torsion member towards a blade tip side of the rotor blade is secured to the flap.

2. A flap support mechanism according to claim 1, further comprising a bearing having a rotational axis coaxial with the axis of angular displacement of the flap, said bearing coupling the rotor blade to the flap.

3. A flap support mechanism according to claim 1, wherein said tension-torsion member passes through a cavity formed at an interior of the flap and is secured to the flap at a location towards the blade tip side of the rotor blade.

4. A flap support mechanism according to claim 1, wherein said tension-torsion member passes through a cavity formed at an interior of the flap and is secured to the flap at a location towards the blade tip side of the rotor blade.

5. A flap support mechanism according to claim 1, further comprising a tuning weight provided at a leading edge side of the flap, said tuning weight being operable to align a center of mass of the flap with the axis of angular displacement of the flap.

6. A flap support mechanism for angularly displaceable support of a flap attached to a rotor blade, said flap support mechanism comprising:

first and second tension-torsion members disposed coaxial with an axis of angular displacement of the flap, said first and second tension-torsion members being partially contained within both the flap and the rotor blade, wherein a first end of said first tension-torsion member towards a blade root side of the rotor blade is secured to the rotor blade and a second end of said first tension-torsion member towards a blade tip side of the rotor blade is secured to the flap, and a first end of said second tension-torsion member towards the blade root side of the rotor blade is secured to the flap and a second end of said second tension-torsion member towards the blade tip side of the rotor blade is secured to a tension mechanism.

7. A flap support mechanism according to claim 6, wherein said first tension-torsion member and said second tension-torsion member are mutually coupled.

8. A flap support mechanism according to claim 6, further comprising a stabilizer bearing operable to prevent radial deviation of said first tension-torsion member and said second tension-torsion member.

9. A flap support mechanism according to claim 7, further comprising a stabilizer bearing operable to prevent radial deviation of said first tension-torsion member and said second tension-torsion member.

10. A flap support mechanism according to claim 6, further comprising a tuning weight provided at a leading edge side of the flap, said tuning weight being operable to align a center of mass of the flap with the axis of angular displacement of the flap.

11. A flap support mechanism according to claim 6, wherein the flap and the rotor blade are only connect via said first tension-torsion member and said second tension-torsion member.

12. A flap support mechanism according to claim 6, wherein the tension mechanism connects said second end of said second tension-torsion member to the rotor blade, the tension mechanism comprising a slide weight connected to said second end of said second tension-torsion member, the slide weight being moveable in a blade spanwise direction in a cavity within the rotor blade.

13. A flap support mechanism according to claim 6, wherein the tension mechanism connects said second end of said second tension-torsion member to the rotor blade, the tension mechanism comprising a lever rod connected to the rotor blade at a pivot point and a lever point, said second end of said second tension-torsion member being connected to a central region of the lever rod.

14. A flap support mechanism according to claim 6, wherein the tension mechanism connects said second end of said second tension-torsion member to the rotor blade, the tension mechanism comprising a nut connected to said second end of said second tension-torsion member, a stationary plate having a hole therein and being connected to the rotor blade, and a bolt passing through the hole in the stationary plate and connecting to the nut.

15. A flap-equipped rotor blade comprising:

a flap;

a rotor blade; and a tension-torsion member disposed coaxial with an axis of angular displacement of said flap, said tension-torsion member being partially contained within both said flap and said rotor blade, wherein a first end of said tension-torsion member towards a blade root side of said rotor blade is secured to said rotor blade and a second end of said tension-torsion member towards a blade tip side of said rotor blade is secured to said flap.

16. A flap-equipped rotor blade comprising:

a flap;

a rotor blade;

a tension mechanism; and first and second tension-torsion- members disposed coaxial with an axis of angular displacement of said flap, said first and second tension-torsion members being partially contained within both said flap and said rotor blade, wherein a first end of said first tension-torsion member towards the blade root side of said rotor blade is secured to said rotor blade and a second end of said first tension-torsion member towards the blade tip side of said rotor blade is secured to said flap, and a first end of said second tension-torsion member towards the blade root side of said rotor blade is secured to said flap and a second end of said second tension-torsion member towards the blade tip side of said rotor blade is secured to said tension mechanism.

17. A flap-equipped rotor blade according to claim 16, wherein said flap and said rotor blade are only connect via said first tension-torsion member and said second tension-torsion member.

18. A flap-equipped rotor blade according to claim 16, wherein said tension mechanism connects said second end of said second tension-torsion member to said rotor blade, said tension mechanism comprising a slide weight connected to said second end of said second tension-torsion member, said slide weight being moveable in a blade spanwise direction in a cavity within said rotor blade.

19. A flap-equipped rotor blade according to claim 16, wherein said tension mechanism connects said second end of said second tension-torsion member to said rotor blade, said tension mechanism comprising a lever rod connected to the rotor blade at a pivot point and a lever point, said second end of said second tension-torsion member being connected to a central region of said lever rod.

20. A flap-equipped rotor blade according to claim 16, wherein said tension mechanism connects said second end of said second tension-torsion member to said rotor blade, said tension mechanism comprising a nut connected to said second end of said second tension-torsion member, a stationary plate having a hole therein and being connected to the rotor blade, and a bolt passing through the hole in said stationary plate and connecting to said nut.

* * * * *